S. A. THORNTON.
TRACTOR.
APPLICATION FILED NOV. 28, 1917.
1,292,922.
Patented Jan. 28, 1919.
4 SHEETS—SHEET 1.
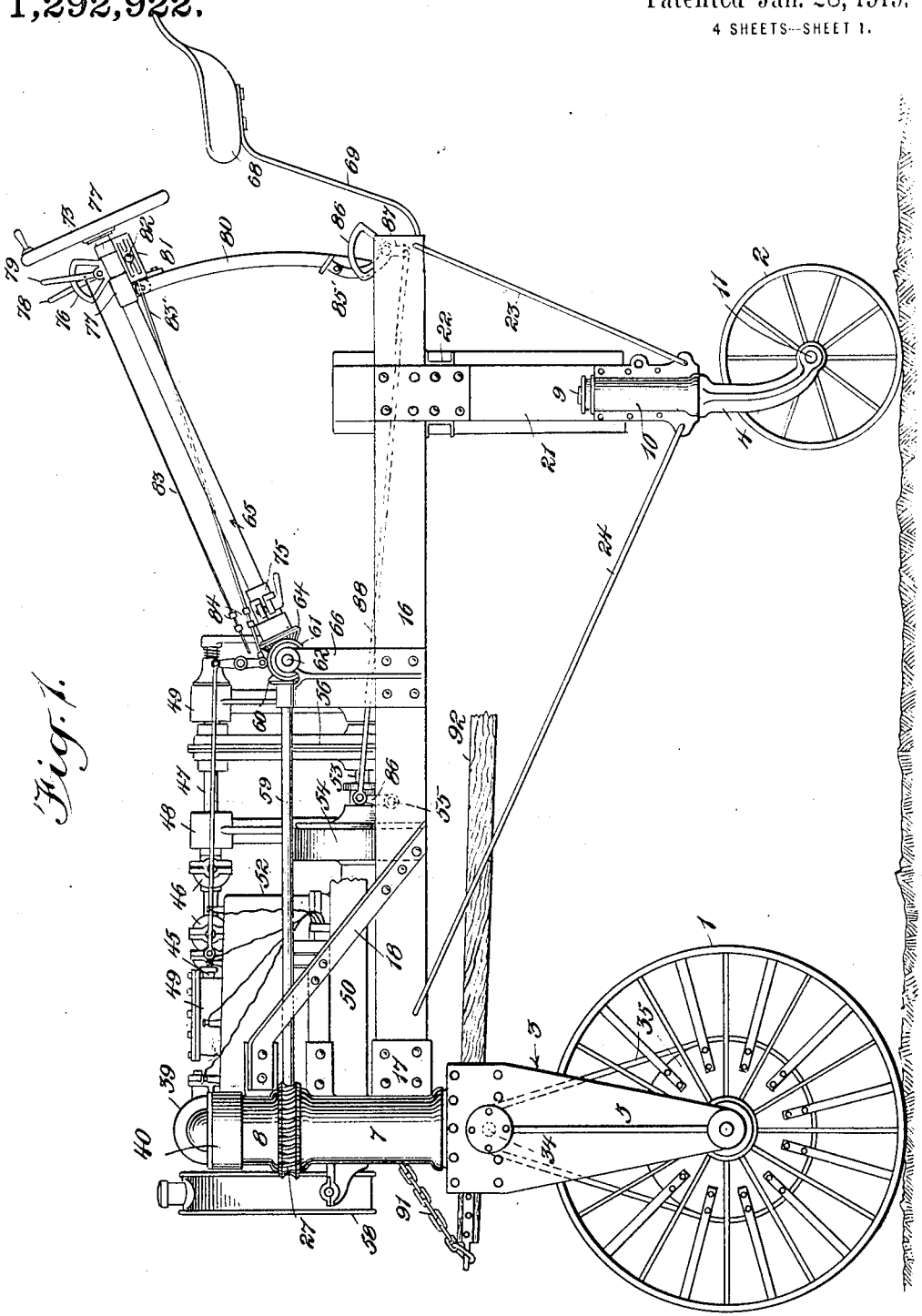
WITNESSES
INVENTOR
S.A. Thornton
BY
ATTORNEYS

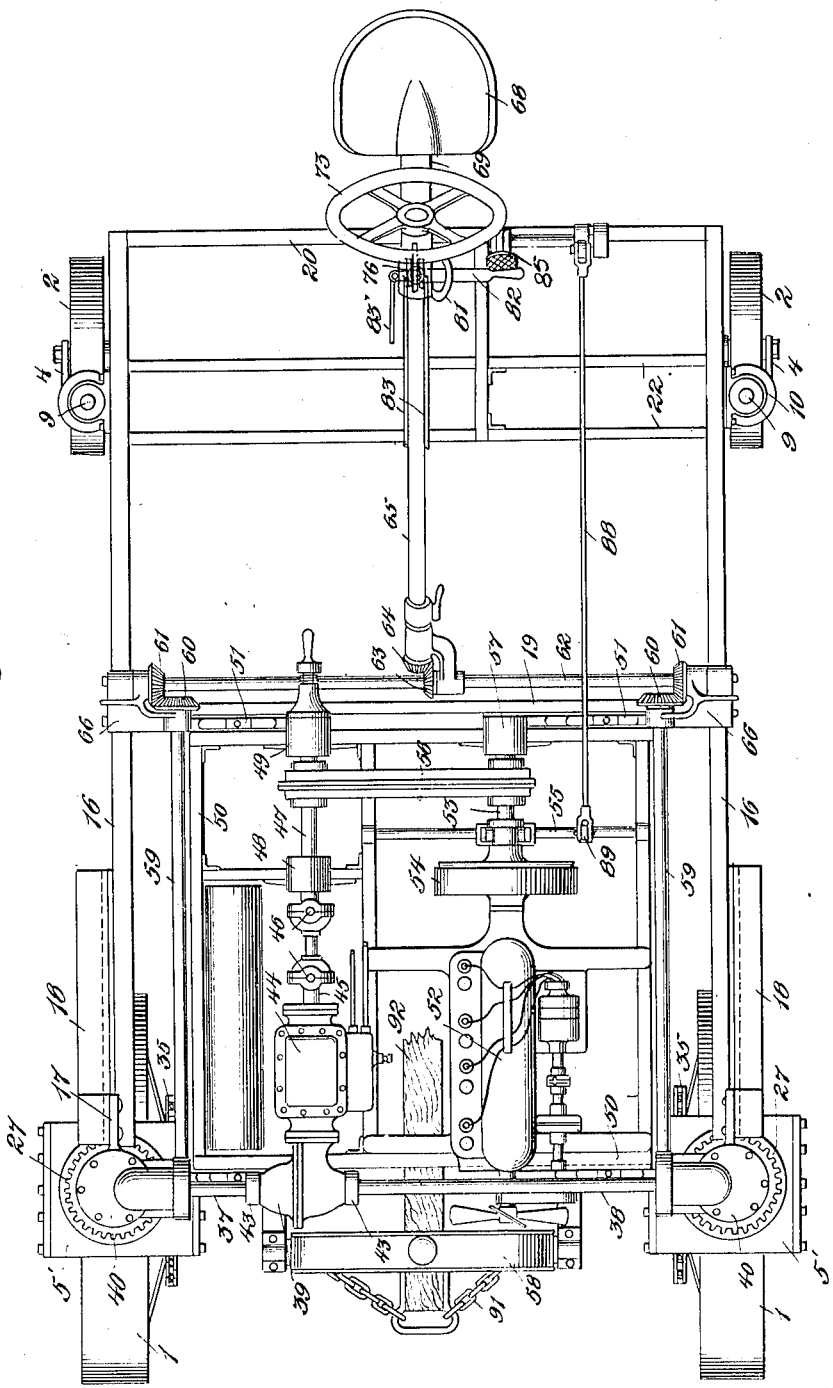

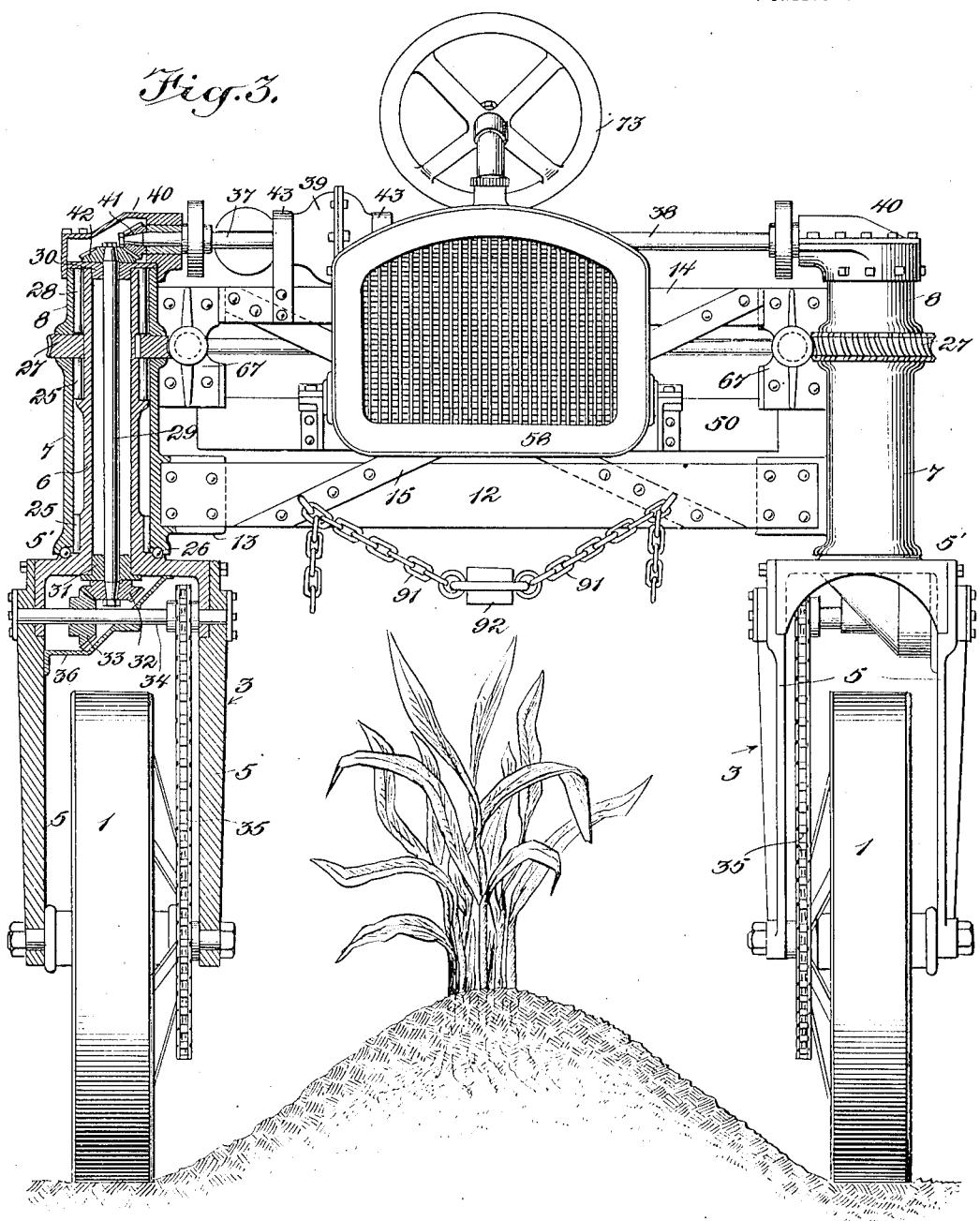

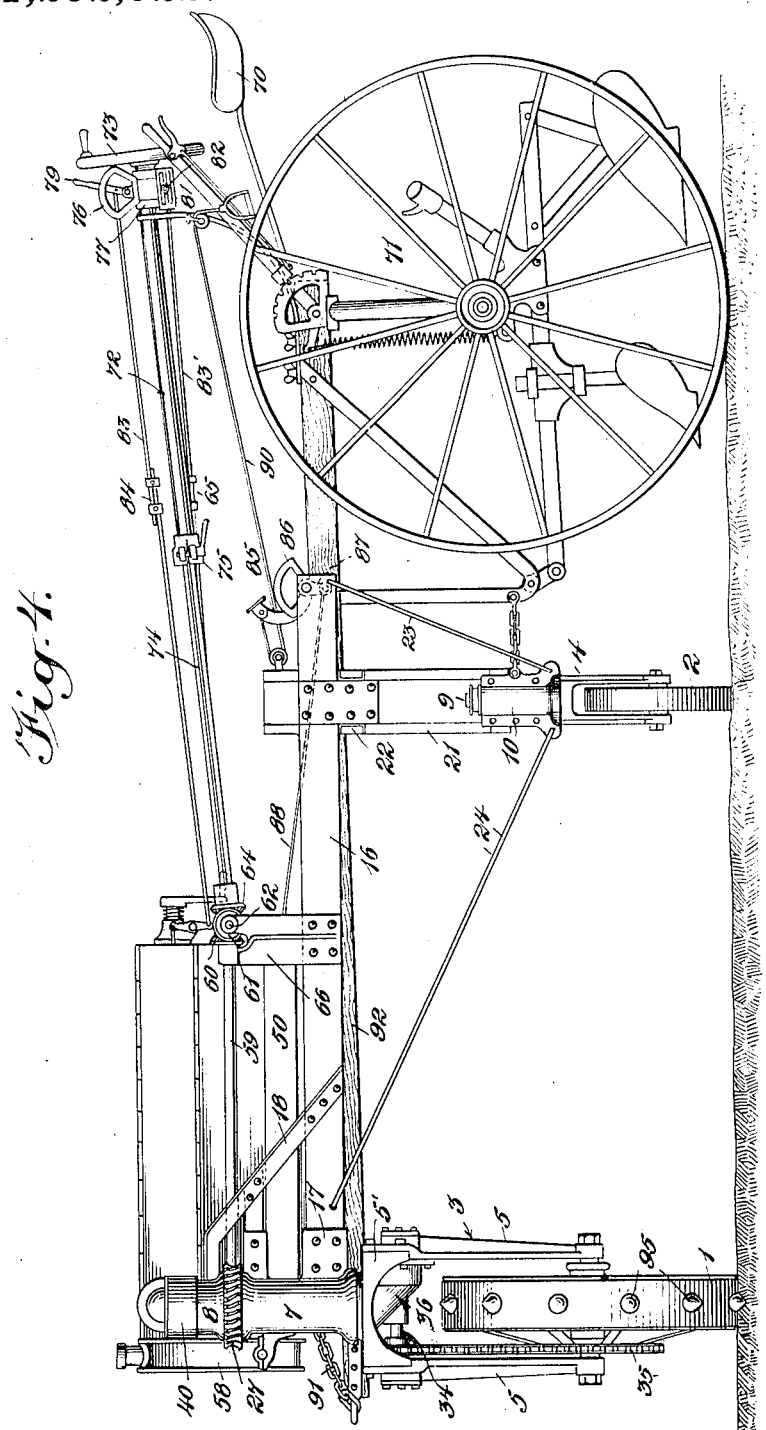

UNITED STATES PATENT OFFICE.

SAMUEL ADELBERT THORNTON, OF NEW ORLEANS, LOUISIANA.

TRACTOR.

1,292,922.            Specification of Letters Patent.      Patented Jan. 28, 1919.

Application filed November 28, 1917. Serial No. 204,364.

*To all whom it may concern:*

Be it known that I, SAMUEL A. THORNTON, a citizen of the United States, and a resident of New Orleans, in the parish of Orleans and State of Louisiana, have invented a new and Improved Tractor, of which the following is a full, clear, and exact description.

This invention relates to a tractor for drawing farm implements or vehicles, and the invention has for its general objects to improve the construction of machines of this character so as to be reliable and efficient in use, and so designed that a farm implement, vehicle or other load can be hitched thereto in such a manner that the tractor takes the place of one or more draft animals with the possibility of making short turns and taking up no more space than the animal or animals.

A more specific object of the invention is the provision of a tractor having a novel construction and arrangement of front steering and traction wheels which can turn on vertical axes passing through the axles, whereby the tractor can turn on a short radius, there being rear trailing wheels for facilitating short turning, all the wheels being so arranged with respect to the frame of the tractor that the pole, tongue or shaft of a vehicle or farm implement can be hitched to the very front of the tractor in the same manner as a team of horses are hitched for the purpose of obtaining a prompt and accurate response to the "gee" or "haw" motion of the tractor, and also the spacing of the wheels and the height of the frame will enable the tractor to straddle rows of plants that are being cultivated.

A more specific object of the invention is the provision of a novel construction of frame including bearing boxes for the vertical trunnions of the forks for the front steering and traction wheels, in combination with novel means for turning the forks and additional novel means for applying power to the traction wheel through the trunnion.

A further object of the invention is to provide an extensible steering column and operating connections for the control of the engine and the shifting of the gears, whereby the tractor can be operated from a seat fastened to the rear of the frame or from a seat on the farming implement or other load drawn by the tractor.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the tractor showing the tongue of the vehicle or other load hitched thereto;

Fig. 2 is a plan view;

Fig. 3 is a front view with a portion in section, showing the mounting and driving means of one of the steering and driving wheels;

Fig. 4 is a side view of the tractor with a sulky plow hitched thereto, the tractor having its wheels set for making a short turn; and Fig. 5 is a detail view of the rim or tire of one of the traction wheels.

Referring to the drawing, 1 designates the front steering and driving wheels and 2 the rear trailing wheels, the former being mounted in steering forks 3, and the latter in curved caster forks 4. The front forks 3 comprise side members 5 bolted to the base 5' of a vertical trunnion 6 that is journaled in a bearing box composed of upper and lower sections 7 and 8 which are fastened to the frame of the machine. Each rear fork 4 has an upwardly extending trunnion 9 suitably journaled and cushioned in a box 10. The fork 4 bends backwardly so that the axle 11 of the rear wheel 2 is behind the vertical axis of the trunnion 9, so that the rear wheels will automatically turn as the tractor is steered.

The lower sections 7 of the front bearing boxes are connected by a horizontal bar 12 riveted to lugs 13, and the upper sections 8 are fastened to a horizontal bar 14, the bars 12 and 14 being laced together by tie strips 15. This forms the front of the main frame, the sides being formed by side channel beams 16 riveted to rearwardly extending lugs 17 on the lower bearing box section 7, and the upper bearing section 8 is connected with the side beams 16 by inclined brace bars 18, whereby the front bearing boxes for the trunnions of the front forks 3 will be maintained rigidly in upright position. The side beams are connected together by transverse beams 19 and 20, and depending from the side beams are the legs 21 which carry the rear wheels, and the upper ends of these legs are connected together by a pair of horizontal transverse beams 22. The lower ends of the legs 21 are held rigidly in place by tie rods 23 and 24 leading respectively from the bottoms of the legs to the rear and front of the side beams 16.

As shown in Fig. 3, the trunnion 6 rotates in the bearing box section 7 on bearing rollers 25, and ball bearings 26 are interposed between the lower end of the section 7 and the disk or bottom 5' of the trunnion. Interposed between the sections 7 and 8 and keyed to the trunnion is a worm wheel 27 forming part of the steering mechanism, and in the upper section 8 are bearing rollers 28. The trunnion 6 is hollow and a vertical shaft 29 extends therethrough, it being journaled in bearings 30 and 31. On the lower end of the shaft 29 is a bevel gear 32 which meshes with a bevel gear 33 on a horizontal shaft 34 which is journaled in the upper portions of the fork members 5, and between this intermediate shaft 34 and associated steering wheel 1 is a sprocket and chain driving means 35 whereby the wheel 1 will be positively driven. An incasing plate 36 coöperates with the top part of the fork 3 to form a housing to hold lubricant for the gears 32 and 33.

The two steering and driving wheels 1 are driven by a horizontal transverse shaft made in two parts 37 and 38 connected by differential gearing within the casing 39, and each section extends into a cap 40 carried by the upper part 8 of the trunnion bearing boxes, there being bevel gears 41 and 42 on the parts of the differential shaft and the shafts 29 in the trunnions. The caps 40 form housings which contain the lubricant for the gears. The casing 39 of the differential gearing is carried by upstanding brackets 43 on the top front bar 14. As shown in Fig. 2, the change speed gear box 44 is arranged behind the differential gearing and the gear shaft 45 is connected by universal joints 46 with an intermediate shaft 47 extending longitudinally of the machine and carried by bearings 48 and 49 on the power plant frame 50, which frame is of rectangular form and has springs 51 at its corners which yieldingly support the power plant frame on the tractor frame.

On the frame 50 is a suitable internal combustion engine 52 which is connected with a propeller shaft 53 by a clutch 54 of any approved form, a movable part of the clutch being operatively connected with a rock shaft 55 under the control of the driver. Between the shafts 53 and 47 is a suitable transmitting mechanism inclosed within a housing 56, the shaft 53 being journaled in a bearing 57 extending upwardly from the rear of the frame 50. Brackets extend forwardly from the frame 50 to support the radiator 58 at the front of the tractor.

The driving and steering wheels 1 are simultaneously turned for steering the tractor, and for this purpose the longitudinally extending shafts 59 are arranged at opposite sides of the main frame and have worms (not shown) meshing with the worm wheels 27 on the trunnions 6, and on the rear ends of the shafts 59 are bevel gears 60 which mesh with bevel gears 61 on a transverse shaft 62, the latter having a central bevel gear 63 that meshes with a bevel gear 64 on the steering post 65. The shafts 59 and 60 are journaled in common bearing brackets 66 rising from the side beams 16 of the main frame, and the front ends of the shafts 59 are journaled in thrust bearings 67 riveted to the sections 7 and 8 of the bearing boxes for the front forks.

The steering post 65 is specially constructed so that it can be extended in order to permit the driver to occupy the seat 68, Figs. 1 and 2, which is mounted on the main frame by the spring 69, or to occupy the seat 70 of the agricultural implement 71, Fig. 4. For this purpose the steering post 65 has a tubular section 72, to which the operating wheel 73 is fastened at the rear end, and a non-circular section 74 telescopes in the section 72 and has fastened to it the bevel gear 64. A clamp 75 on the section 72 holds the two sections 72 and 74 rigidly together in any position to which they are relatively adjusted. The means for shifting the gears and for controlling the timer and throttle of the engine are mounted on the rear end of the steering shaft or column 65 in such a manner as not to rotate with the section 72. For instance, the quadrant 76 for the timer and throttle has bands or rings 77 which encircle the steering column, and on this quadrant are the controlling levers 78 and 79 which maintain an upright position, since one of the bands 77 is fastened to a supporting member 80 which rises from the rear end of the tractor frame, and also on this support 80 is the quadrant 81 for the gear shifting lever 82 which is connected by the rod 83' with the gear box. The rods 83 connected with the controlling levers 78 and 79 are made in sections adjustably coupled together at 84, so that these rods can be extended when the steering post is extended, and for the same purpose the gear shifting rod 83' is made in coupled sections.

The clutch 54 is controlled by a pedal 85 mounted at the rear of the tractor frame and associated with a quadrant 86, and the pedal has an arm 87 connected by a rod 88 with the crank 89 on the clutch-operating rock shaft 55, the pedal being close to the seat 68 so that the operator can readily actuate the pedal with the foot. When an agricultural implement is hitched to the tractor a cable 90 is connected with the pedal, as shown in Fig. 4, so that the operator when seated in the seat 70 can pull the clutch open by hand or foot.

At the front of the tractor are chains or equivalent elements 91 by which the front of the tongue 92 of the agricultural implement, vehicle or other load is hitched to the tractor for the purpose of obtaining a prompt and accurate "gee" or "haw" motion of the agricultural implement, vehicle or other load being drawn and so that the tractor occupies to the tongue 92 the same position that a team of horses does, and consequently the tractor takes up no more room than the horses and turns can be effected in just as small a space as with horses.

The tires of the traction wheels 1 may be constructed as shown in Fig. 5, wherein creosoted wood 93 is bolted between the flanges 94 of the felly, and to increase the tractive effect the tire may have spurs or equivalent means 95, Fig. 4. Instead of creosoted wood any other equivalent material may be used on the felly of the wheel.

From the foregoing description taken in connection with the accompanying drawings, the advantages of the construction and method of operation will be readily understood by those skilled in the art to which the invention appertains, and while I have described the principle of operation, together with the machine which I now consider to be the best embodiment thereof, I desire to have it understood that the machine shown is merely illustrative and that such changes may be made when desired as fall within the scope of the appended claims.

Having thus described my invention, I claim as new and desire to secure by Letters Patent:

1. A tractor comprising a body having vertical bearing boxes at its front, steering forks having trunnions disposed in the boxes, wheels mounted in the forks, driving means extending through the trunnions for rotating the wheels, said bearing boxes being formed of divided sections, one above the other, a worm wheel on each trunnion and disposed between the box sections, worms meshing with the said worm wheels, and operator-actuated means for turning the worms to steer the traction wheels.

2. A tractor comprising a frame having a vertical bearing box made in upper and lower sections, a fork having a trunnion, a worm wheel disposed between the sections and keyed to the trunnion, a thrust bearing carried by and disposed outside the said sections of the box, a shaft journaled in the bearing and having a worm meshing with the worm wheel, a traction wheel disposed in the fork, and means for driving the traction wheel.

SAMUEL ADELBERT THORNTON.